Aug. 18, 1936.  P. WITTE  2,051,159
NOZZLE MAKING AND CAPPING MACHINE
Filed Sept. 28, 1935   8 Sheets-Sheet 1
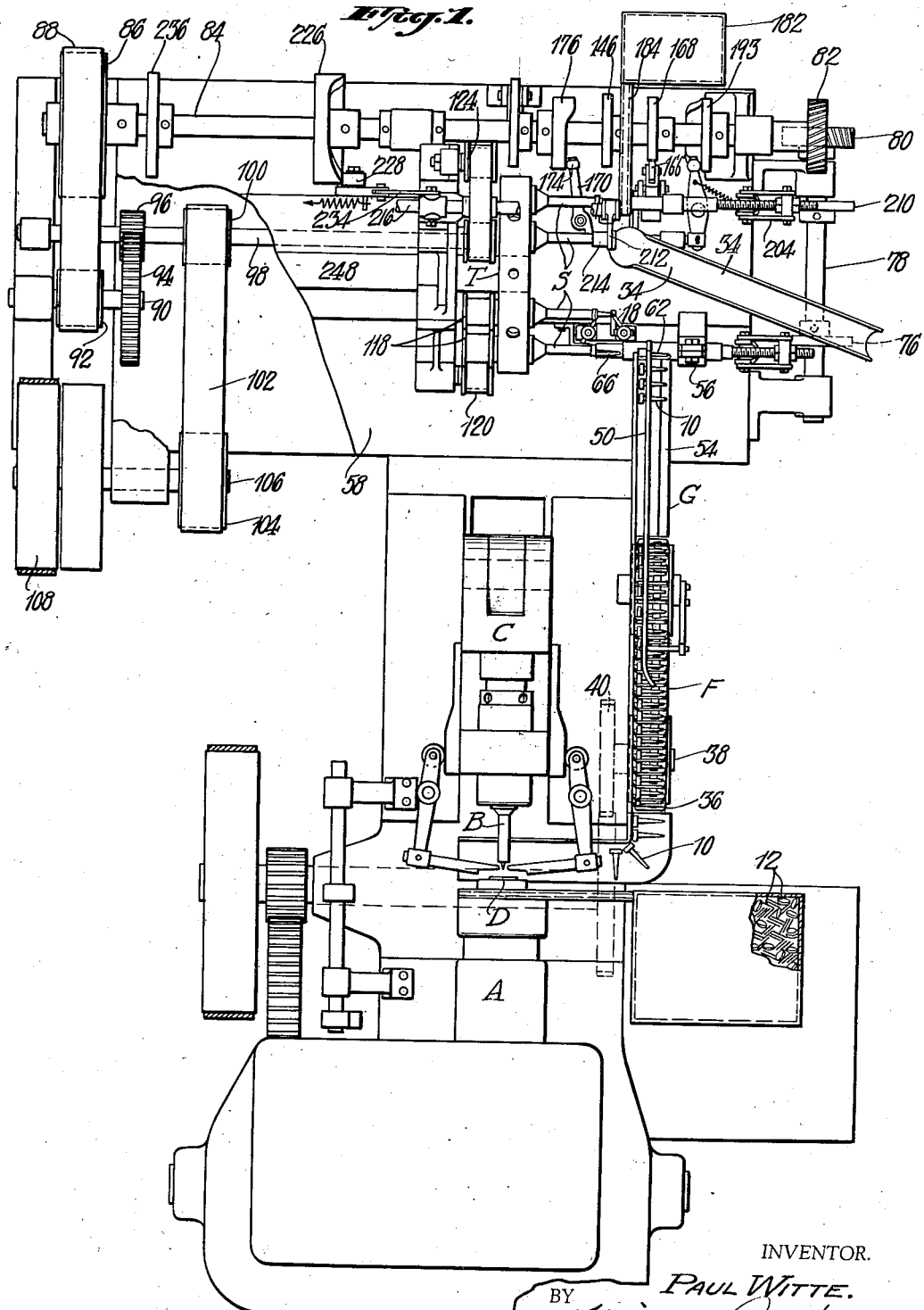
INVENTOR.
PAUL WITTE.
BY
ATTORNEYS

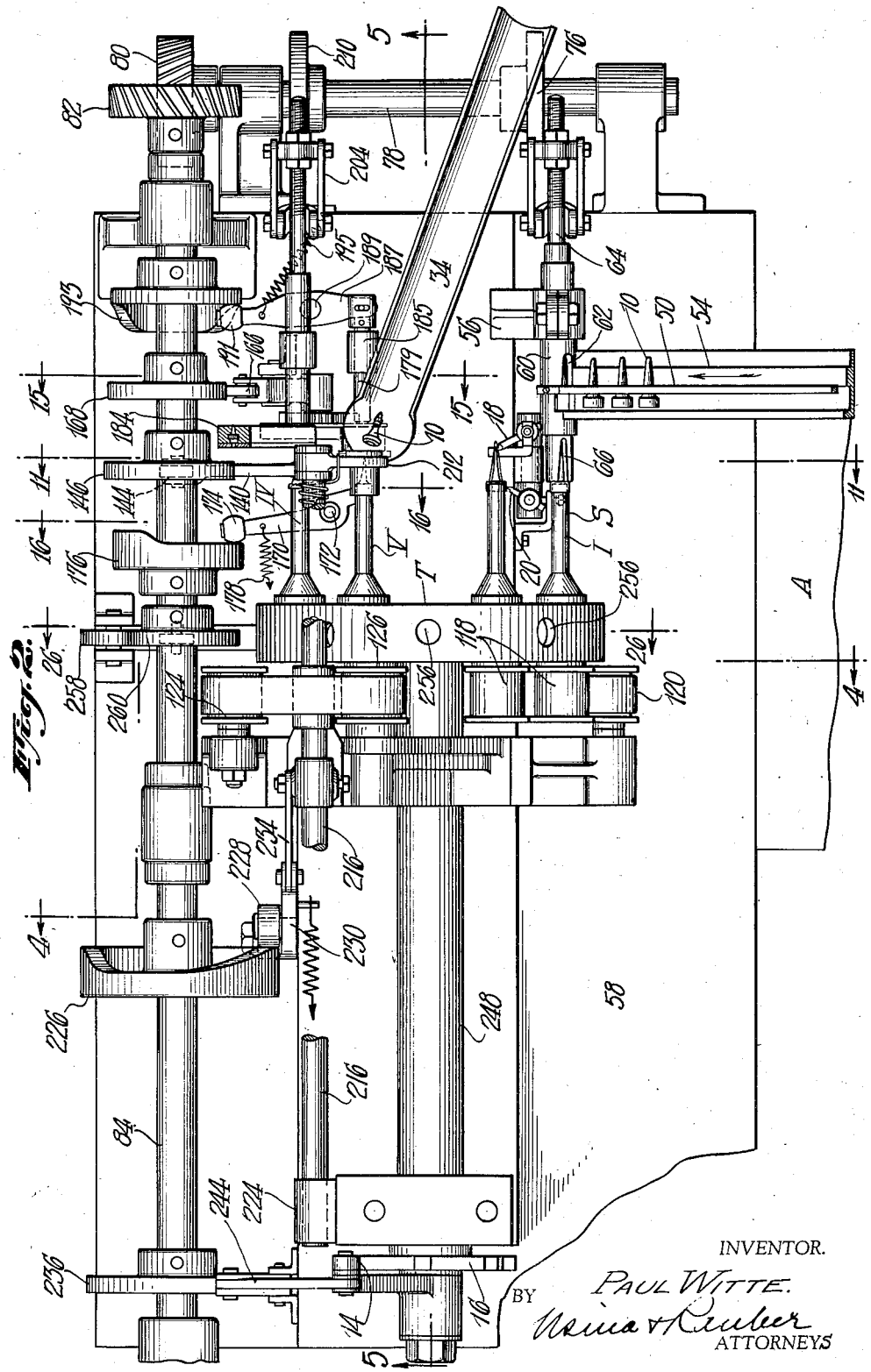

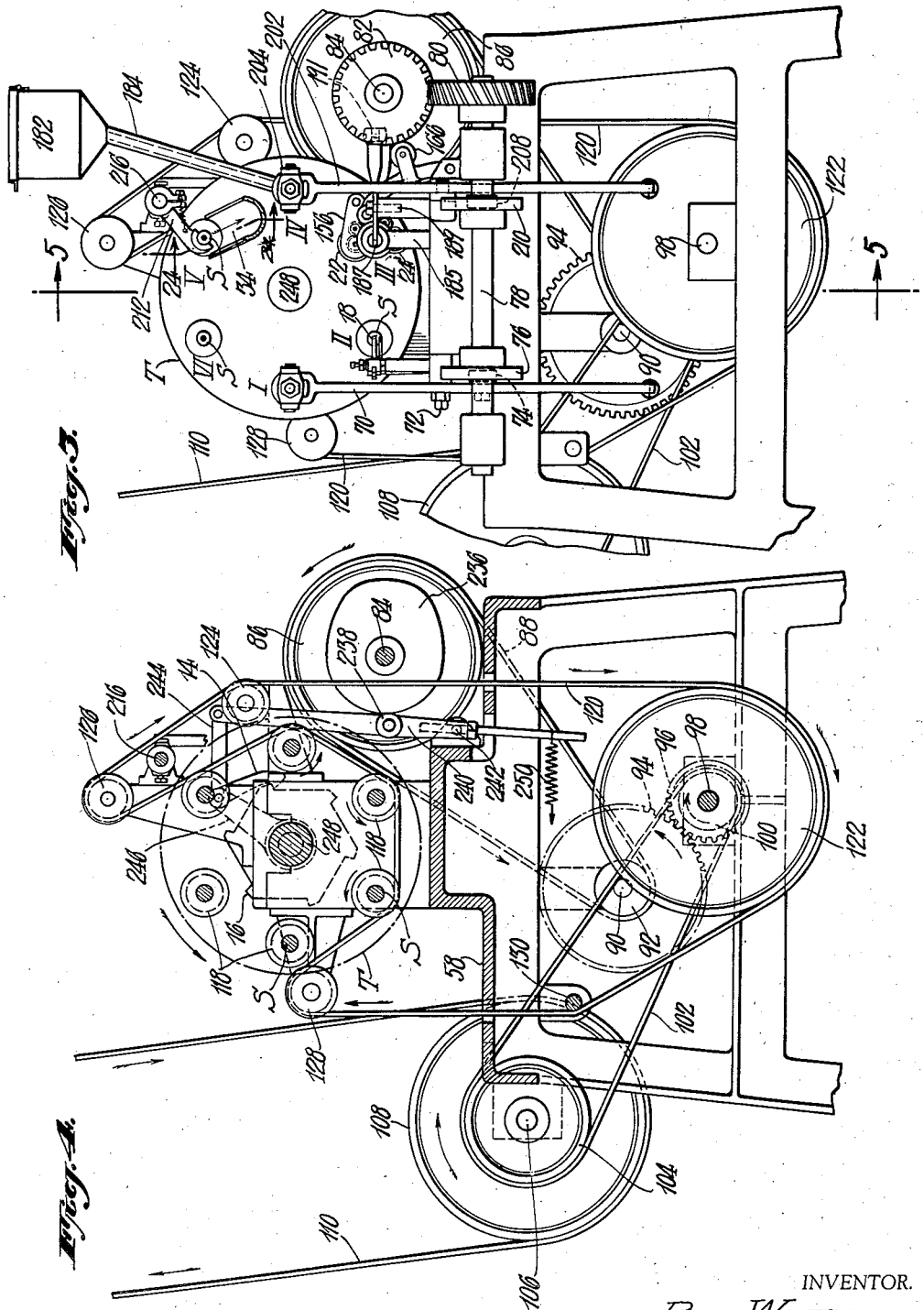

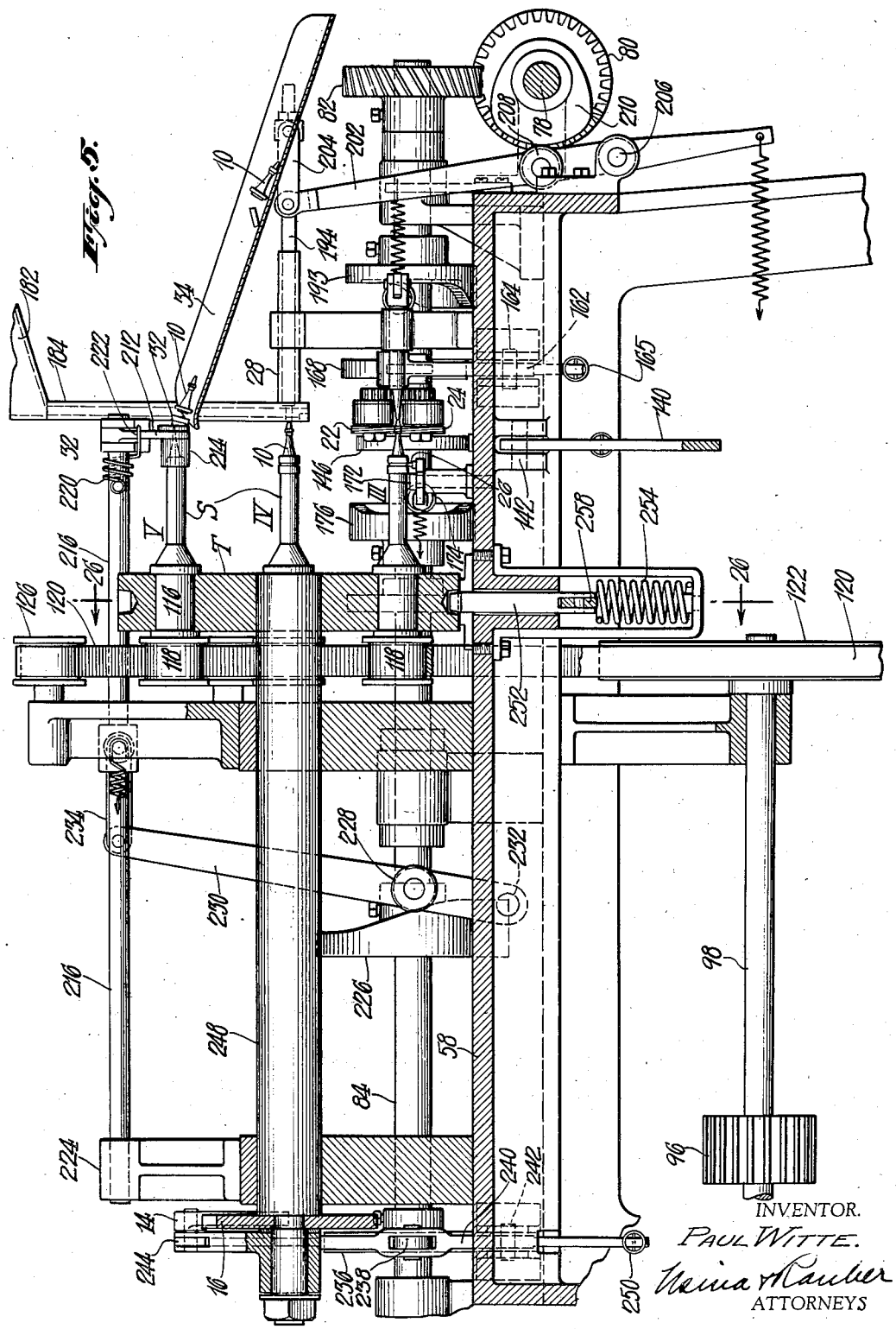

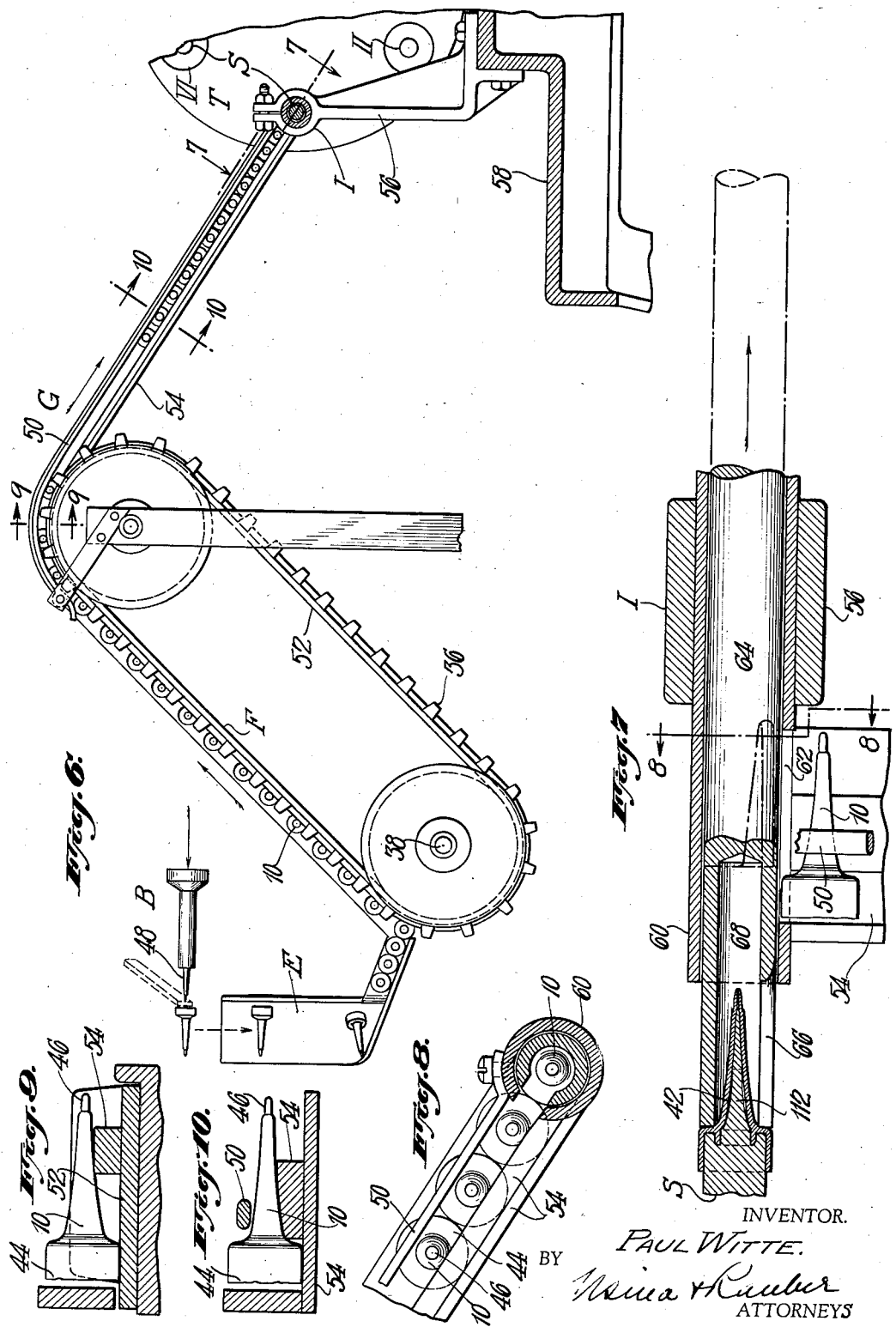

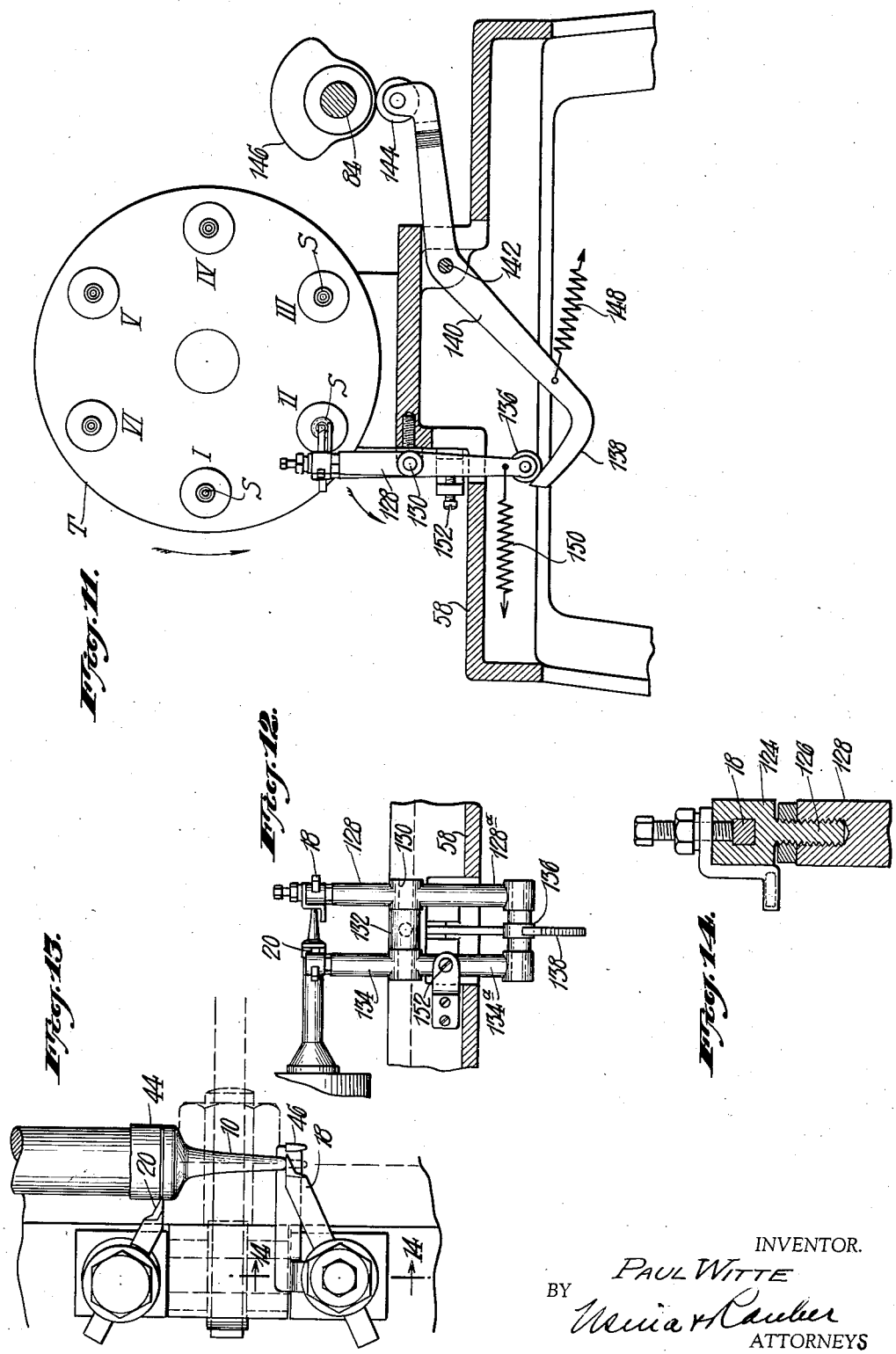

Aug. 18, 1936.  P. WITTE  2,051,159
NOZZLE MAKING AND CAPPING MACHINE
Filed Sept. 28, 1935   8 Sheets-Sheet 7
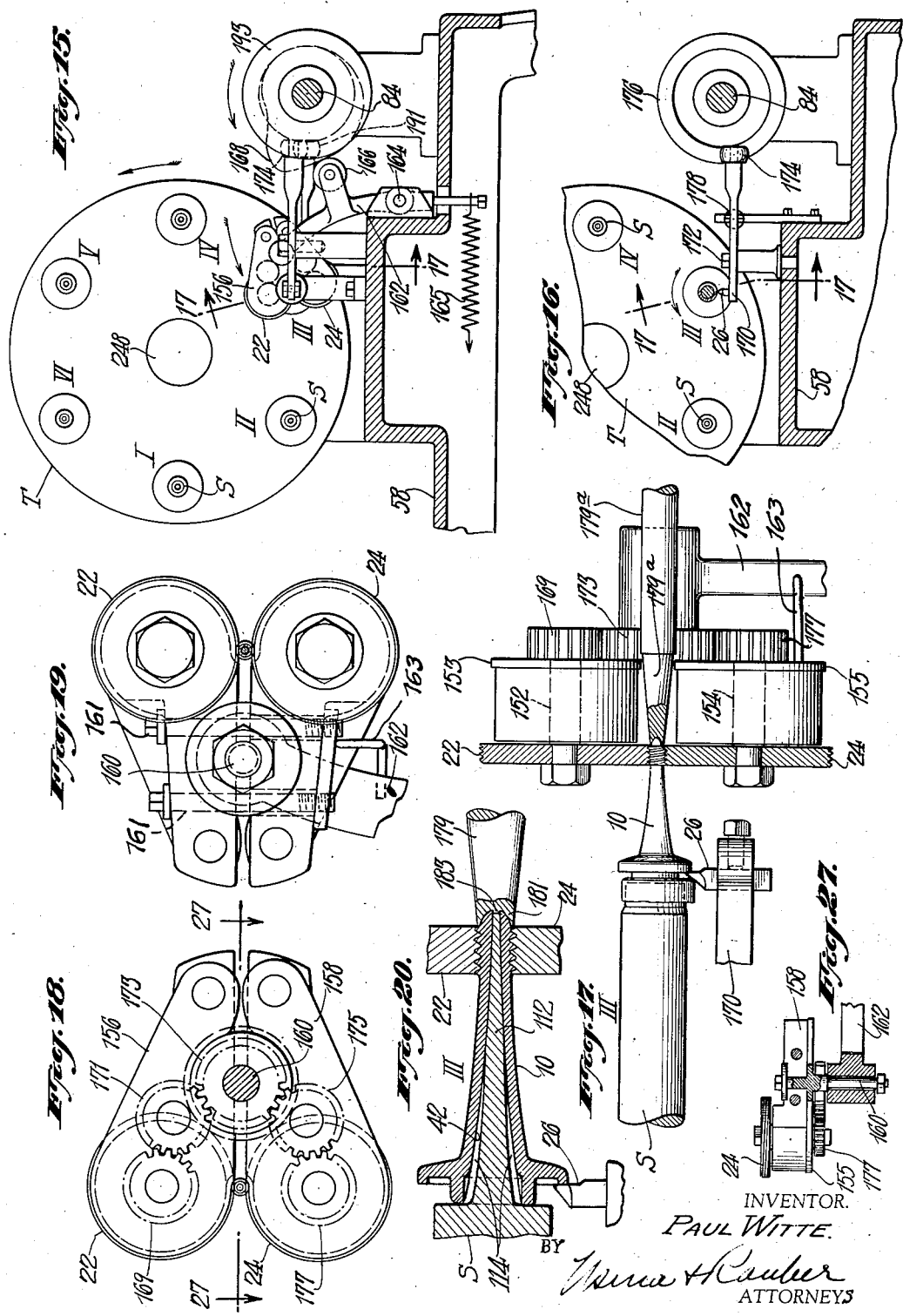
INVENTOR.
PAUL WITTE.
BY
ATTORNEYS

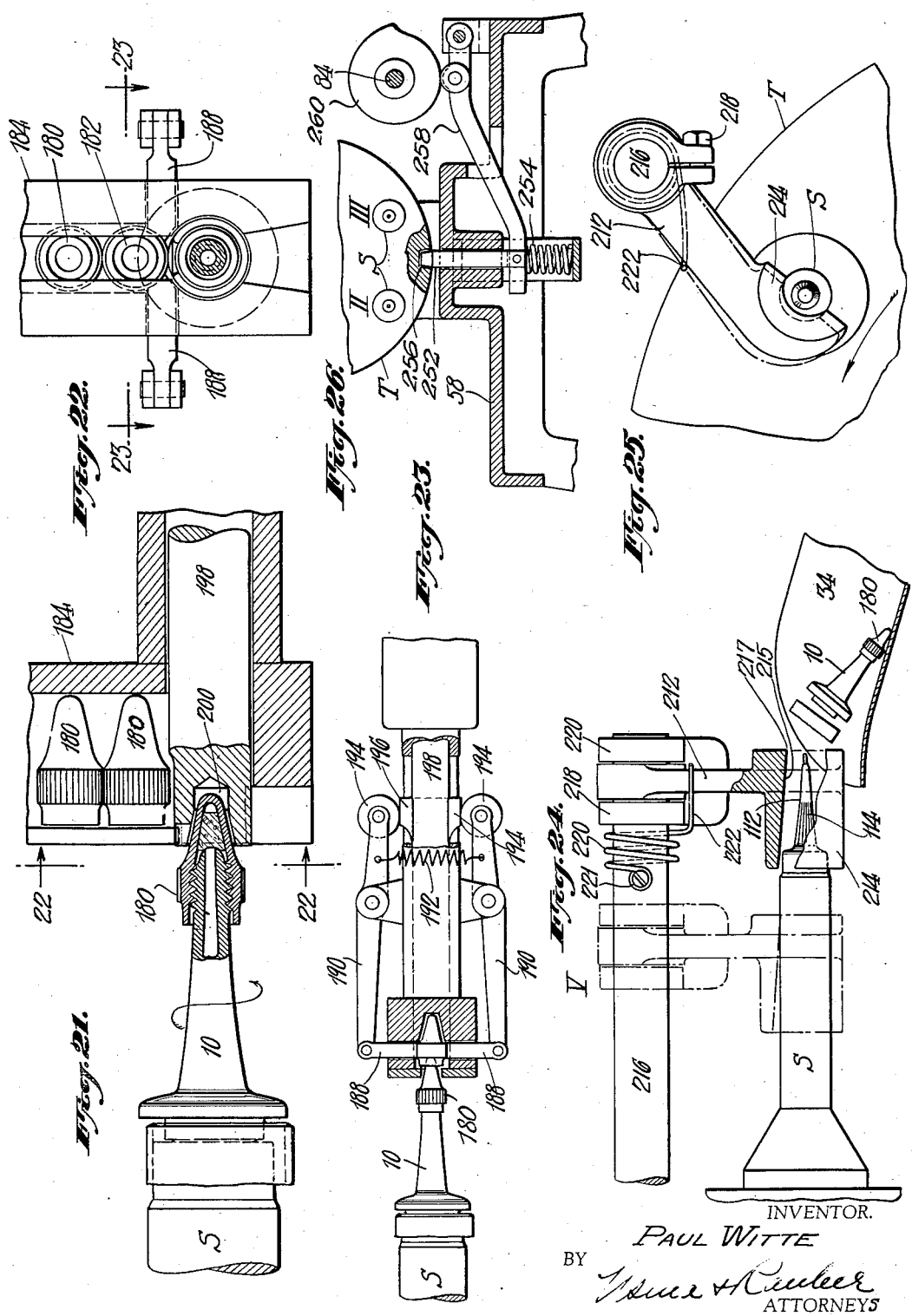

Patented Aug. 18, 1936

2,051,159

UNITED STATES PATENT OFFICE 2,051,159

NOZZLE MAKING AND CAPPING MACHINE

Paul Witte, New Milford, N. J., assignor to White Metal Manufacturing Company, Hoboken, N. J., a corporation of New Jersey Application September 28, 1935, Serial No. 42,578

10 Claims. (Cl. 29—38)

This invention relates to improvements in mechanism for making nozzles adapted to be secured to the ends of oil cans or other hollow containers and for applying caps to such nozzles.

The invention is embodied in a machine hereinafter more fully described in detail, which is effective to take disc-like slugs of ductile metal, such as block tin, aluminum, or the like and form said slugs into nozzles with tapered restricted openings extending therethrough. Each nozzle is formed with an enlarged butt end approximately equal in diameter to the size of the oil can or other container to which it is adapted to be secured, and an elongated tapered snout forming the discharge end of the nozzle. The improved machine forms such nozzles from the disc-like blanks or slugs and leads the same down a suitable guide where each is picked up by chain conveyor or other carrier. This carrier elevates the nozzles to the top of an inclined feed chute, whereupon they roll down to a feed station in alignment with one of several spindles carried by a rotary turret.

The turret is intermittently advanced so as to bring the spindles thereon successively to operating stations equipped with devices adapted to perform different operations on the nozzles. For example, at the first station, the nozzle is applied to one of the spindles on the turret. The latter then advances this spindle to a second station, where the two ends of the nozzle are simultaneously trimmed off by edge tools brought into engagement therewith. The turret then carries the spindle in question to a third station where threads are formed on one extremity of the nozzle and the butt end is given a finished cut. At the same time, the extreme discharge end of the nozzle is subjected to a finishing operation, which forms a finished rounded end thereon. The turret is then further advanced to a station, where a cap is screwed on the threaded end of the nozzle. After this operation, the turret is again advanced to a station where a stripping device comes into operation to remove the completed capped nozzle from the spindle and also strip off the waste metal, which was severed from the butt end of the nozzle. The described cycle is then repeated, it being understood that the turret referred to carries several spindles and that several of the described operations are being carried on simultaneously on different nozzles carried by different spindles, as they occupy the respective operating stations.

The mechanism above described and to be further described in detail is peculiarly well suited for mass production and for effectively performing the various automatic mechanical and cutting operations on small pieces such as nozzles of the type referred to, which require delicate handling and a nicety of manipulation in order to produce articles free from rough edges or other imperfections in finish. For more complete disclosure of the improved mechanism embodying the invention, reference is to be had to the following detailed description, the accompanying drawings and the appended claims.

In the drawings:—

Fig. 1 is a plan view illustrating the general arrangement of the various cooperating elements of the mechanism; Fig. 2 is an enlarged plan view of the mechanism shown in the upper part of Fig. 1 and relating chiefly to the instrumentalities for performing the various cutting, finishing and threading operations on the nozzles; Fig. 3 is an end elevation of parts viewed from the right in Fig. 2; Fig. 4 is a vertical section taken on the staggered line 4—4 of Fig. 2; Fig. 5 is a vertical longitudinal section taken on line 5—5 of Figs. 2 and 3; Fig. 6 is a detail view illustrating conveyor mechanism and feed mechanism for transferring the nozzles from the mechanism which forms them to the mechanism for performing various operations thereon; Fig. 7 is a detail section on line 7—7 of Fig. 6; Fig. 8 is a fragmentary detail section on line 8—8 of Fig. 7; Figs. 9 and 10 are detail sectional views taken on the correspondingly numbered lines of Fig. 6; Fig. 11 is a detail view taken on line 11—11 of Fig. 2 illustrating mechanism for effecting the first trimming operation on the nozzle; Fig. 12 is an elevation projected from the left side of Fig. 11; Fig. 13 is an enlarged plan view of a portion of Fig. 11 and illustrating means for simultaneously trimming the ends from the nozzle; Fig. 14 is a detail section on line 14—14 of Fig. 13; Fig. 15 is a detail vertical section on line 15—15 of Fig. 2 illustrating mechanism for threading one end of the nozzle and simultaneously finishing the opposite end thereof; Fig. 16 is a fragmentary view illustrating portions in a plane to the rear of that shown in Fig. 15, this view being taken on line 16—16 of Fig. 2; Fig. 17 is an enlarged detail section taken approximately on line 17—17 of Figs. 15 and 16; Figs. 18 and 19 are enlarged detail views of thread forming mechanism shown in Figs. 15 and 17; Fig. 20 is an enlarged longitudinal sectional view, illustrating chiefly the means for forming the threads on the extremity of the nozzle and for centering and smoothing the extreme end thereof; Fig. 21 is a detail view illustrating the mechanism for applying caps to the threaded end of the nozzle; Fig. 22 is a section on line 22—22 of Fig. 21; Fig. 23 is a horizontal section on line 23—23 of Fig. 22; Fig. 24 is a detail view of the ejector mechanism as viewed from the plane indicated by line 24—24 of Fig. 3; Fig. 25 is an elevation projected from the right side of Fig. 24; Fig. 26 is a detail view of the turret lock taken on lines 26—26 of Figs. 2 and 5; Fig. 27 is a section on line 27—27 of Fig. 19.

Referring first in a general way to the main operating instrumentalities of the mechanism as a whole, A represents a machine forming nozzles 10 from flat discs 12, this machine including a reciprocating plunger B operated by toggle mechanism C which receives its motion from a main drive pulley P through operating connections of known design and arrangement which need not be further described except to say that mechanism is effective to cause the plunger B to move back and forth into operative engagement with the die D so as to transform the discs 12 into the nozzles indicated at 10 by an extruding operation.

The thus formed nozzles roll by gravity down an inclined chute E into position to be elevated by a conveyor F to a guide chute G so that each nozzle will slide down the guide chute, to the first operating station I. In sequence, nozzles are then carried around by suitable spindles S, on a turret T to the operating stations II, III, IV and V.

In the machine shown, there are six spindles S on the turret T which is given an intermittent motion, the same being advanced intermittently ⅙ of a revolution by means of a pawl 14 which coacts with the six-toothed ratchet 16.

When a given spindle reaches station I, a nozzle is firmly engaged therewith. The turret carries this nozzle to station II, where cutting tools 18 and 20 come into play to trim the tip and the butt ends, respectively, therefrom. The turret then carries the nozzle to station III, where a thread is formed on the tip end by threading tools 22 and 24 and at the same time the butt end is neatly finished by the cutting tool 26.

As the turret advances the spindle in question to station IV, cap feeding mechanism 28 comes into play and feeds a cap 180 into engagement with the then rotating nozzle, thus screwing the cap thereon. The turret then advances the spindle in question to an ejector station V, where the ejector mechanism 30 (Figs. 24 and 25) is effective to strip the capped nozzle 10 from the spindle and also to eject the waste end 32 therefrom. These parts slide by gravity or roll down the discharge chute 34. During their travel down the chute, the waste ends may be picked out by an operator and discarded and the capped nozzles directed to a suitable storage receptacle, not shown.

When the spindles reach station VI, they are blank, no operations being performed at this point and the cycle starts over again at station I.

Having thus given a brief description of the sequence of operations, I will now set forth the improved mechanism for effecting these various operations.

The conveyor F is driven by means of a sprocket 36 carried on a shaft 38 driven through a gear 40, which is operatively connected to the drive pulley P by suitable gearing, not shown.

The nozzles 10, when struck up or extruded from the blanks, are formed with an inner longitudinally extending passageway or cavity 42 (see Figs. 7 and 20). The butt end 44 of the nozzle will be somewhat uneven and the tip end 46 will have a slight burr or projection thereon, which results from the operation of forming a central cavity 42. This cavity is formed by the action of a piercing pin 48 secured to and forming part of the plunger B.

This roughly formed nozzle after having been elevated by the conveyor F and engaged with the guide strip 50 and the supporting portions 52 and 54 of the guide chute G rolls down by gravity, as indicated in Figs. 6 and 8 to a point in juxtaposition to the station I on the turret.

A bracket 56 secured to the machine base 58 has secured at its upper end a guide tube 60 which is apertured at 62 to permit the nozzles 10 to fall into the tube upon the withdrawal movement of a feed plunger 64, which is slidable longitudinally of the tube. This feed plunger has a cut-away portion 66 therein, to permit the snout of the nozzle to enter the cavity 68. The feed plunger 64 is reciprocated by a feed lever 70, pivoted at 72 to a fixed boss on the frame and the lever carries a cam roller 74 coacting with a cam 76 secured to a shaft 78. This shaft is driven through spiral gears 80 and 82 from a shaft 84.

The shaft 84 carries a pulley 86 driven by a belt 88 from a pulley 92 on a jack shaft 90. This shaft carries a gear 94 meshing with the gear 96 on a shaft 98 carrying a pulley 100 which is driven by a belt 102 from a pulley 104 carried on the main drive shaft 106, driven from a tight and loose pulley 108 by a belt 110, from an overhead line shaft, not shown.

Each spindle S has an elongated extension 112 of reduced diameter whose exterior is fluted or roughened so as to make a good driving engagement with the nozzles, as indicated at 114 in Fig. 24. These flutes or roughened portions dig into the face of the interior of the chamber formed in the snout of the nozzle, so that as the spindles are rotated about their respective axes the nozzles will be compelled to rotate therewith.

Each of the spindles is provided with a portion 116 which is journalled in the turret T and adjacent the rear face of the turret, the spindles have secured thereto pulleys 118. These pulleys are driven by a belt 120 which, as best shown in Fig. 4, is trained around a driving pulley 122 and the plurality of idler pulleys 125—127—129 and 131. As thus arranged the belt 120 is effective to drive the several pulleys 118 on the spindles as they periodically arrive at the stations II, III and IV. But, this belt clears the pulleys on the spindles opposite the stations I and V. Thus, it is clear that at stations II, III and IV the nozzles will be rotated about their respective axes.

In juxtaposition, the station II, means are provided for operating the trimming cutters 18 and 20, which, as best shown in Figs. 11 to 13, sever the extruded part on the end of the nozzle snout and also the rough edge from the butt end of the nozzle. The trimming tool 18 is carried by a chuck 124 having a threaded shank 126 by means of which it is positioned with provision for vertical adjustment relatively to a tool carrier 128 pivoted at 130 to a bracket 132 secured to the frame of the machine. A similar carrier and mounting 134 is provided for the tool 20, both carriers being adapted to rock about the pivotal axis of the bracket 130.

Arms 128a and 134a extend downwardly from the carriers 128 and 134 supporting a roller 136 which coacts with the cam-shaped end 138 of the lever 140 pivoted at 142 and carrying a roller 144, which coacts with a cam 146 secured to the shaft 84. A spring 148 serves to hold the roller 144 against the cam. As thus arranged, it is apparent that as the cam 146 rotates, it will be effective to rock the lever 140 and thus cause the cam end 138 thereof to rock the tool carriers 128. The tools carriers 128 and 134 are adapted to be rocked in one direction about their pivotal support 130 by strong spring 150 and an adjustable stop 151 is provided so as to limit the movement of the tool carriers. In this way, an accurate adjustment of the depth of cut can be secured. It is evident that the spring 150 tends to move the cutters 18 and 20 into cutting engagement with the tip and butt ends of the nozzle and that the cam 146 is effective to retract said tools after they have thus trimmed the ends of the nozzle.

After such initial rough trimming, the pawl 14 and ratchet 16 are effective to advance the turret ⅙ of a revolution and thus carry the spindle to station III, where the threading operation on the tip end is performed and the finish trimming operation at the butt end is effected. At the station III, the spindle S and the nozzle 10 carried thereby are rotated, it being apparent from Fig. 4 that the spindle pulley 118 will contact with and be driven by the belt 120.

The threading tools 22 and 24 at this station are, as shown in Figs. 17 to 19 inclusive, of circular form with V-shaped teeth cut in their faces. These tools are journalled on studs 152 and 154 secured to supporting members 156 and 158, which are pivotally supported by stud 160 carried at the free end of a rocker arm 162, which in turn is pivoted at 164 to a bracket secured to the frame. The pivotal mounting for the supporting members 156 and 158 is desirable so that the position of the threading tools 22 and 24 can be adjusted with precision so that, as the rocker arm 162 moves forward to engage the nozzle, the arc defined by the center of the space between the two tools will coincide with the axis or center line of the nozzle. To secure this accurate adjustment and to permit the cutters to swivel freely in the case of slight variations, the friction between the members 156 and 158 and the stud 160 may be varied by adjustment of clamp screws 161 (Fig. 19). A stop 163 formed of a light piece of rod or wire secured to the rocker arm 162 serves to limit the downward movement of the tool supporting members 156 and 158 due to the influence of gravity, as will be understood.

The rocker arm 162 carries a roller 166, which coacts with a cam 168 on a shaft 84 and a spring 165 serves to hold the roller against the cam. As thus arranged, it is apparent that the cam will rock the threading tools into position for engagement with the nozzles and that because of the swiveled mounting of the members, which support the threading tools, they will be automatically centered with the nozzle and the spindle. It is to be noted that, during the threading operation on a nozzle of small diameter and considerable length, it is important in the interest of accurate and neat work to provide means so that the stress imposed by the threading operation will not deflect the nozzle off center.

I, therefore, provide a centering device, which in the embodiment illustrated is in the form of a reciprocating rod 179, which is axially aligned with the nozzle carrying spindle. This member also serves to form a neat finish on the extreme end of the nozzle snout as the latter is rotated. This member 179 and its operating mechanism will be hereinafter more fully referred to.

The movements of the parts are so timed that during the threading operation the finishing tool 26 comes into play to make a neat finishing cut on the back end of the nozzle. This operation being indicated in Figs. 17 and 20.

The finishing tool 26 is carried by a lever 170 pivoted at 172 to an upright secured to the frame of the machine. This lever carries at one end a roller 174, which rides on a cam 176. Thus, rotation of the cam is effective to control the cutting movement of the finishing tool 26. A spring 178 serves to hold the cam roller in proper cooperative engagement with the cam 176, as best shown in Fig. 2.

To insure that the threads formed by the two rotating threading tools 22 and 24 will properly track, the tools are geared to one another by means of the meshing gears 169—171—173—175 and 177 shown in Fig. 18.

The members 156 and 158 have projecting ribs 153 and 155, as shown in Fig. 17, which are adapted to coact with the surface of the tapered end 179ª of the reciprocating rod 179, so as to assist in properly positioning the tools 22 and 24 for engagement with the work.

Means are provided whereby simultaneously with threading of the end of the nozzle snout, the same is subjected to a finishing operation, so as to smooth off any burr or rough edge. As shown in Figs. 17 and 20, this means is combined with the slidable rod 179, the forward end of which is formed with a rounded cavity having a short central projection, as shown in Fig. 20. Thus, as the member 179 is reciprocated it engages the end of the rotating nozzle and accurately centers the same during the threading, as shown in Figs. 17 and 20 and serves the added function of spinning the tip end of the nozzle beyond the threads, thus forming a smooth rounded teat and at the same time the projection 183 makes a neat finish for the outlet orifice.

These features are of importance, particularly in the mass production and handling small parts and in formation of threads thereon, it being noted here that the nozzles which this machine is adapted to produce and handle are of extremely short length and small diameter,—the length of the nozzle over-all being approximately from one inch to one and one-half inch,—the diameters being of an order of one-quarter of an inch or less.

The centering and spinning rod 179, after its functions have been performed, must be retracted to permit the nozzle to be moved to the next station upon movement of the turret. To effect such retracting of the rod, I slidably support it in a bearing 185 formed in a bracket secured to the base of the machine. The retracting movement of the rod is effected by a lever 187 pivoted at 189 and having a cam roller 191 coacting with the cam 193. A spring 195 serves to press the cam roller into coaction with the cam. As thus arranged, it is apparent that, as the spindle dwells at station III, three operations will take place on the nozzle, namely, the threading operation, the finishing of the butt end and the spinning or smoothing of the extreme end of the snout. Upon completion of the finishing of such extreme end, the cam will retract the rod 179, so that the nozzle can move clear thereof upon turning movement of the turret.

Upon completion of the threading, trimming and spinning operations just described, the turret advances the spindle and the nozzle carried thereby to station IV for application of the cap. Caps 180 which have previously been threaded are supplied from a hopper 182, which has a feed chute 184 connected therewith for delivering the caps in succession to a point in alignment with the spindle at said station. As the caps reach the bottom of the feed chute, they come to rest against a pair of oppositely extending fingers 188 shown in Figs. 22 and 23. These fingers are actuated by levers 190 whose rearward arms are urged toward one another by a spring 192. These rearward arms carry rollers 194 which coact with cams 196 carried by reciprocating plunger 198. The end of this plunger has a cavity 200 (Fig. 21) formed therein, which is of a size and shape suited to the form of the cap. Reciprocation of the plunger serves to retract the fingers 188 and thus release the bottom-most cap in the feed chute and permit it to fall into alignment with the cavity in the plunger. Then, as the plunger moves toward the turret carrying the cap with it, the latter is screwed on the threaded end of the nozzle, it being remembered that the spindle carries a pulley 118, which is rotated at this station by the belt 120. The reciprocation of the cap feeding plunger 198 is effected by the lever 202 (Figs. 3 and 5) connected with such plunger through the links 204. The lever 202 is pivoted at 206 and it carries a roller 208, which coacts with a cam 210 carried by the shaft 78 hereinabove referred to.

Upon completion of the capping operation, the turret is advanced so as to carry the spindle to station V where the capped nozzle and the trimmed-off waste end are stripped from the spindles. The stripping mechanism (Figs. 24 and 25) includes a lever 212 having a stripping jaw 214 on its free end. This jaw, as shown, has a tapered arcuate surface 215 so that the relatively sharp edge or corner will be provided where the surface 217 intersects the front face of the member, thus the corner or edge will make close contact with the spindle S for a considerable part of the circumference thereof, so as to secure a wide bearing engagement with the end of the waste end portion previously trimmed from the nozzle. As the stripping jaw is moved from the dotted to the full line position of Fig. 24, it will effectively strip both the waste end and the nozzle from the spindle, thus ejecting them into the discharge chute 34.

The stripping lever is mounted with freedom for pivotal motion on a reciprocating rod 216 between hub portions 218 and 220 of a yoke, which is clamped to the rod 216 by a bolt 218. A torsion spring 220 is secured by a screw 221 at one end of the rod 216 and its opposite end 222 serves to press the jaw toward the spindle. The rod 216 is slidably supported in suitable bearings, one of which is indicated at 224, Fig. 5. Reciprocation is transmitted to the rod 216 by an ejector cam 226 acting through a cam roller 228 carried on an operating lever 230 pivoted at 232 and having a link connection 234 with the ejector rod.

As the completely finished and capped nozzles slide by gravity down the inclined chute 34 to a receptacle, not shown, the waste end portions, which were trimmed off at the station I and finally stripped from the spindles at station V, can be picked out by the operator and discarded.

The ratchet 16 and pawl 14, which impart the intermittent rotary movements to the turret, so as to bring the spindles successively into registry with the different stations described are driven from the shaft 84 (Fig. 4) by means of a cam 236 carried thereby, which coacts with the roller 238 carried by an operating lever 240 pivoted at 242 to a bracket secured to the frame. The upper end of this lever 240 is connected by a link 244 to an arm 246, which carries the pawl 14, this arm being fulcrumed on the shaft 248, which supports the turret T. A spring 250 secured to an extension on the end of the lever 240 serves to press the roller 238 against the cam 236. It is clear that, as the cam rotates with the shaft 84, the same will, through the connections described, intermittently actuate the turret shaft, so as to bring the turret spindles successively to the respective operating stations hereinabove referred to in detail. Thus the several cooperative instrumentalities described are all properly synchronized to perform their respective functions. During its several dwell periods, the turret is locked against rotary movement by a bolt 252 (Fig. 26) which is forced by a spring 254 into one of the six notches 256 formed in the face of said turret. The bolt is periodically retracted by a lever 258 actuated by a cam 260 secured to the shaft 84.

In the foregoing, I have described broadly means for performing the various functions and have also disclosed in detail the specific means for performing such functions. In a broad sense, some of the functions are secured by means operating according to known general principles, however, the specific instrumentalities disclosed have been found in practice to effectively perform their respective functions both individually and in combination and the invention is particularly directed to such specific instrumentalities and combinations and arrangements of parts, as defined with particularity in the appended claims.

What I claim is:

1. In a machine of the character described, a rotary turret carrying a rotating nozzle supporting spindle, a movable member carrying rotary threading tools, a nozzle centering element having a portion aligned with the axis of said spindle and constituting a tool for centering and finishing the end of the nozzle snout carried by said spindle and means for moving said element toward and away from said spindle.

2. In a machine of the character described, a rotary turret carrying a rotatable nozzle supporting spindle, an element having a concaved portion aligned with the axis of said spindle and constituting a tool for imparting a smooth finish to the tip end of a nozzle carried by the spindle, and means for moving said element toward and from said spindle.

3. In a machine of the character described, a rotary turret carrying a rotatable nozzle supporting spindle, an element aligned with the axis of said spindle and having a concaved portion surrounding a central projection and means for moving said element toward and from said spindle.

4. In a machine of the character described, a rotary turret carrying a rotatable nozzle supporting spindle, a movable member having pivoted thereon elements carrying rotary threading tools, means coacting with said member for moving the threading tools into and out of engagement with the work, a centering element having a nozzle engaging portion aligned with the axis of the turret spindle and means for automatically engaging and disengaging said centering element with a nozzle carried by said spindle.

5. A nozzle finishing machine of the character described including in combination a rotatably mounted turret carrying a plurality of nozzle-supporting spindles, means for periodically advancing said turret a predetermined fraction of a revolution, nozzle guiding means, means for transferring nozzles from the guiding means to a given one of said spindles, mechanism effective to sever portions from the opposite ends of a nozzle carried by one of said spindles, nozzle threading means including a pair of rotary thread-forming tools geared together, respective supporting members, a trunnion jointly supporting said members and secured to an oscillating rocking arm, means for oscillating said arm periodically so as to move the thread-forming tools to and from a position for coaction with the nozzle, nozzle centering means engaging the end of the nozzle during the threading operation of said tools and mechanism automatically engaging and disengaging said centering means with the work.

6. A nozzle finishing machine of the character described including a turret carrying a plurality of nozzle supporting spindles, means for applying nozzles to said spindles, rotating threading tools, supporting members for the latter, a cam actuated pivoted rocker arm adapted to move said members and the threading tools to and from a position for cooperation with the nozzle, a slidably mounted rod axially aligned with one of said spindles, the end of said rod constituting a finishing tool for coaction with the end of the nozzle snout, and means for automatically moving said rod axially.

7. A nozzle finishing machine of the character described including a turret carrying a nozzle supporting spindle, a rocker arm movable in a plane substantially perpendicular to the axis of said spindle, rotary threading tools carried by elements pivotally supported on said rocker arm, means for adjusting the position of said elements relatively to the rocker arm, a nozzle centering element having a portion aligned with the axis of said spindle and means for moving said centering element into and out of engagement with the nozzle carried by said spindle.

8. In a machine of the character described, a rotary turret carrying a rotatable nozzle supporting spindle, a rocker arm having pivotally mounted thereon members carrying rotary threading tools, a slidable member substantially aligned with the axis of said spindle and having a portion for coaction with said members effective to move the threading tools clear of the work upon completion of their threading function, a finish cutting tool for coaction with the butt end of the nozzle carried by said spindle and means for moving said finishing tool into engagement with the nozzle during the operation of said threading tools.

9. In combination, a machine for producing nozzles comprising a die cooperating with a horizontally reciprocating plunger effective to transform a disc-like blank into a nozzle with an elongated snout, means for transferring nozzles produced by said die and plunger to a point in juxtaposition to a finishing machine, said finishing machine including a turret rotatable on a horizontal axis, the turret carrying a plurality of supporting spindles whose axes are parallel to the axis of rotation of the turret, a main cam shaft whose axis of rotation is parallel with the axis of rotation of the turret, a secondary cam shaft whose axis is at right angles to that of said main cam shaft, gearing operatively connecting said cam shafts, reciprocating means for applying nozzles to one of said spindles, actuating means for said reciprocating means carried by the secondary cam shaft, threading tools, supporting members therefor, a rocker arm pivotally supporting said members and a cam on the main cam shaft for actuating said rocker arm.

10. In combination, a machine for producing nozzles comprising a die cooperating with a horizontally reciprocating plunger effective to transform a disc-like blank into a nozzle with an elongated snout, means for transferring nozzles produced by said die and plunger to a point in juxtaposition to a finishing machine, said finishing machine including a turret rotatable on a horizontal axis, the turret carrying a plurality of supporting spindles whose axes are parallel to the axis of rotation of the turret, a main cam shaft whose axis of rotation is parallel with the axis of rotation of the turret, a secondary cam shaft whose axis is at right angles to that of said main cam shaft, gearing operatively connecting said cam shafts, reciprocating means for applying nozzles to one of said spindles, actuating means for said reciprocating means carried by the secondary cam shaft, threading tools, supporting members therefor, a rocker arm pivotally supporting said members, a cam on the main cam shaft for actuating said rocker arm, stripper means engaged with said spindles and mounted on a reciprocating member, and means on the main cam shaft for actuating said reciprocating member.

PAUL WITTE.